US012754680B2

(12) United States Patent
Eliash et al.

(10) Patent No.: US 12,754,680 B2
(45) Date of Patent: Oct. 6, 2026

(54) DYNAMIC MEMORY OPERATIONS BASED ON HOST PROFILE

(71) Applicant: Micron Technology, Inc., Boise, ID (US)

(72) Inventors: Tomer Eliash, Sunnyvale, CA (US); Xiangang Luo, Fremont, CA (US); Jianmin Huang, San Carlos, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/789,974

(22) Filed: Jul. 31, 2024

(65) Prior Publication Data

US 2026/0037160 A1 Feb. 5, 2026

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC ..... G06F 3/0625; G06F 3/0659; G06F 3/0679
USPC .......................................................... 711/103
See application file for complete search history.

(56) References Cited

U.S. PATENT DOCUMENTS

| | | | | |
|---|---|---|---|---|
| 8,949,483 B1 * | 2/2015 | Martin | G06F 3/0647 | 710/16 |
| 2015/0317248 A1 * | 11/2015 | Lamb | G06F 12/0871 | 711/118 |
| 2019/0129856 A1 * | 5/2019 | Jean | G06F 9/5016 | |
| 2024/0094955 A1 * | 3/2024 | Matsukawa | G06F 3/0614 | |
| 2024/0311232 A1 * | 9/2024 | Noda | G06F 11/076 | |
| 2024/0393949 A1 * | 11/2024 | Na | G06F 3/0647 | |

* cited by examiner

*Primary Examiner* — Gautam Sain

(74) *Attorney, Agent, or Firm* — Schwegman Lundberg & Woessner, P.A.

(57) ABSTRACT

The memory sub-system controller performs different memory operations based on a host profile. The controller accesses a host behavior model comprising an amount of data and timing information. The amount of data can represent how much data was written by a host system to a set of memory components in a past time period. The timing information can indicate when program requests were received from the host system to program the data during the past time period. The controller searches the timing information of the host behavior model based on a current time to identify a time point in the host behavior model that corresponds to the current time. The controller retrieves, from the host behavior model, a parameter that corresponds to the identified time point and performs one or more memory operations based on the parameter retrieved from the host behavior model.

20 Claims, 5 Drawing Sheets

DYNAMIC MEMORY OPERATIONS BASED ON HOST PROFILE

TECHNICAL FIELD

This disclosure relates generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
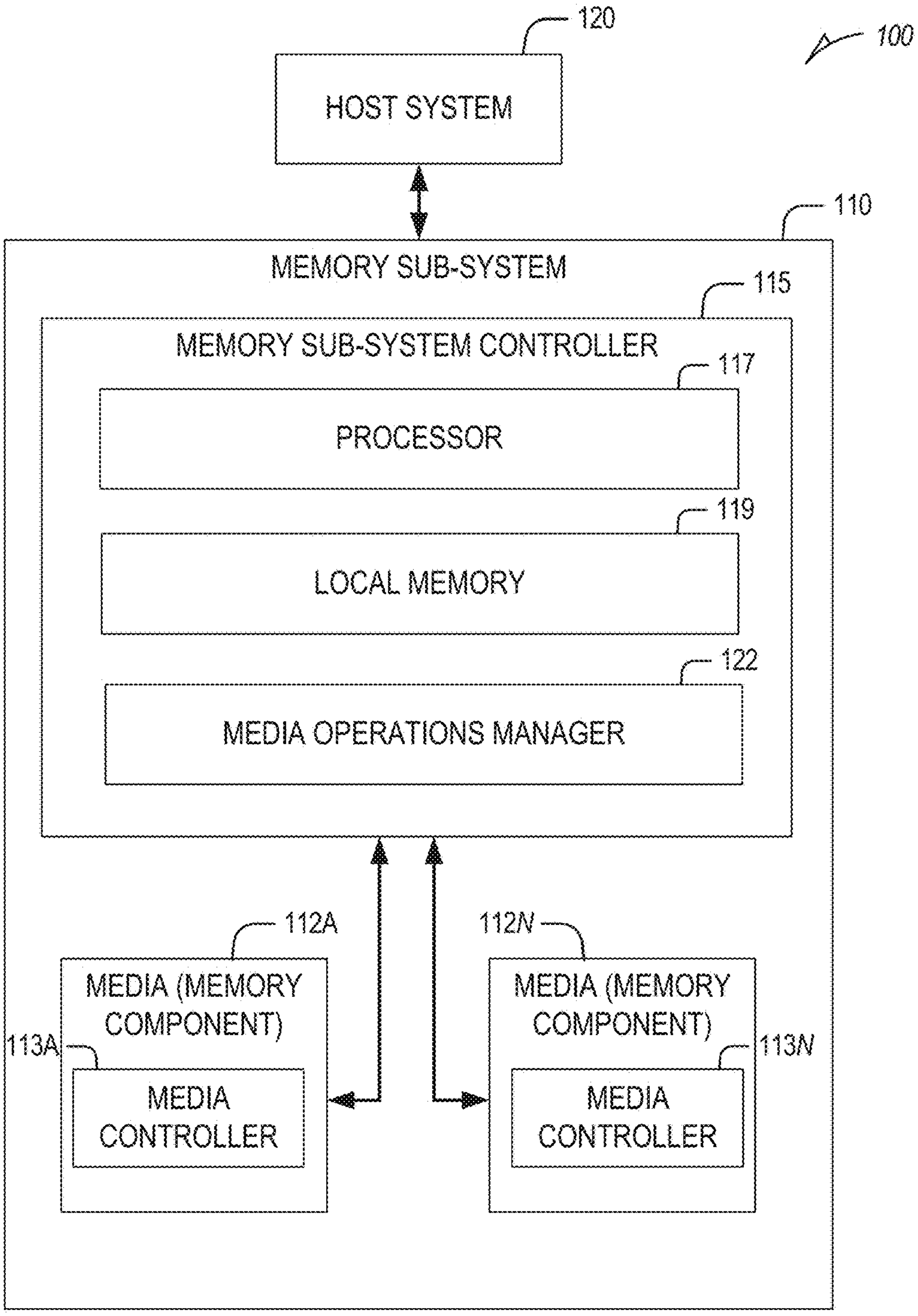
FIG. 1 is a block diagram illustrating an example computing environment including a memory sub-system, in accordance with some examples.

The present disclosure configures a system component, such as a memory sub-system controller, to selectively perform memory operations based on a host behavior model. The controller can track memory operations over time (e.g., over the course of the day, the week, a season, or any other suitable time period). The controller can use this information to build a host behavior model that represents the amount of data programmed by the host system during different time periods. The controller can then control and select which memory operations are performed based on determining the amount of data programmed by the host in a past time period that corresponds to the current time. In some cases, the controller can modify and adjust the size of a write booster (WB) based on the host behavior model. In some cases, the controller can schedule when background operations are performed based on the host behavior model. This improves the overall efficiency of operating the memory sub-system and reduces memory resource consumption.

A memory sub-system can be a storage device, a memory module (or component), or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. In some examples, firmware of the memory sub-system may re-write previously written host data from a location on a memory device to a new location as part of garbage collection management operations. The data that is re-written as part of garbage collection or folding operations (for example, as initiated by the firmware) is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area that can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Typical memory devices, such as NAND flash technology-based memory systems, are integral to a myriad of electronic devices, ranging from personal mobile phones to expansive data centers. Despite their widespread use, these systems encounter several inefficiencies that lead to resource wastage and suboptimal performance. One primary issue is the static nature of WB sizes. The WB, which serves as an intermediate buffer, is important for enhancing write performance by temporarily storing data before it is committed to the slower NAND flash memory or written to tri-level cell (TLC) storage from single-level cell (SLC) storage. The WB is usually implemented as an SLC storage device. However, traditional systems maintain a static WB size that does not adjust according to varying user demands or application needs, often resulting in either underutilization or over-provisioning of memory resources.

Moreover, background maintenance operations such as garbage collection and wear leveling are typically initiated based on fixed schedules or during perceived system idle times. For example, the conventional memory sub-systems monitor host commands to detect that the amount of memory requests that are received is below a threshold amount. The convention memory sub-systems continue to detect that the amount of memory requests that are received is below the threshold amount for a fixed amount of time. When the amount of requests that are received below the threshold continues beyond the fixed amount of time, the controller can trigger performing background maintenance operations. This approach fails to consider actual usage patterns or the dynamic nature of data access, which can lead to unnecessary operations that not only consume power but also system resources, thereby degrading the system's overall efficiency. Also, waiting for the fixed amount of idle time wastes time that could have been spent on performing the background maintenance operations.

Another significant challenge is the lack of adaptation to user behavior. Conventional memory systems do not adjust operational parameters based on real-time user behavior or data access patterns, leading to inefficiencies, such as under fluctuating workloads. This static approach results in considerable resource wastage, including physical memory space, computational power, and energy-factors that are important in determining the operational costs and environmental impact of running these systems.

The present disclosure addresses the above and other deficiencies by providing a memory controller that can adjust the WB size and/or schedules background maintenance operations based on real-time analysis of user (e.g., host system) behavior and data access patterns. By dynamically optimizing the WB size, the memory controller can better manage the temporary storage of write operations, enhancing the overall write performance and reducing the latency in data handling. This approach not only enhances memory utilization efficiency but also reduces resource wastage and boosts overall system performance. By adapting to varying host system demands and operational conditions dynamically, the memory controller manages NAND storage in a sustainable and cost-effective manner, which improves memory sub-system operations and operating efficiency and reduces memory resource consumption.

In some examples, the memory controller accesses a host behavior model including an amount of data and timing information. The amount of data can represent how much data was written by a host system to the set of memory components in a past time period. The timing information can indicate when program requests were received from the host system to program the data during the past time period. The controller can search the timing information of the host behavior model based on a current time to identify a time point in the host behavior model that corresponds to the current time. The controller can retrieve, from the host behavior model, a parameter that corresponds to the identified time point (e.g., the parameter can represent a specified amount of data previously programmed to the set of memory components) and perform one or more memory operations based on the parameter retrieved from the host behavior model. In some cases, the controller can receive a plurality of program requests from the host system and access a real time clock to associate a time with each of the plurality of program requests.

The controller can store a histogram including a quantity of program requests field and a time field. The controller can update the histogram in response to receiving the plurality of program requests. In some cases, the controller can identify a time field in the histogram corresponding to the time of a first program request of the plurality of program requests and increment the quantity of program requests field associated with the identified time field.

The controller can determine whether a second program request of the plurality of program requests corresponds to the identified time field or a different time field in the histogram. The controller can increment the quantity of program requests field associated with the identified time field or the different time field in response to determining whether the second program request of the plurality of program requests corresponds to the identified time field or the different time field in the histogram. The controller can generate the host behavior model based on the histogram, the host behavior model including multiple time periods each associated with a different amount of program requests.

In some examples, each time period represents a threshold number of seconds, a threshold number of hours, a different time of day, a different day of a week, a different day of a month, and/or a different season. The controller can synchronize the real time clock with a host clock of the host system. The controller can configure, in response to performing the one or more memory operations, a size of a WB that is used to intermediately store data.

The controller can determine that the parameter transgresses a threshold value. The controller can, in response to determining that the parameter transgresses the threshold value, increase the size of the write booster. In some cases, the controller can determine that the parameter fails to transgress a threshold value and, in response to determining that the parameter fails to transgress the threshold value, maintain the size of the WB as a default size. The controller can set the WB size to a size represented by the parameter.

In some cases, the WB includes a SLC storage buffer. The data can be transferred to the set of memory components from the SLC storage buffer. Data stored in the SLC storage buffer can be transferred to TLC storage. In some examples, the controller can identify, based on the host behavior model, an idle time period within the past time period. The amount of data during the idle time period being below a threshold amount. The controller can determine that a current time corresponds to the idle time period and, in response to determining that the current time corresponds to the idle time period, perform one or more background operations as the one or more memory operations. The one or more background operations can include a media scan operation and/or garbage collection operation. In some cases, the controller can select between performing direct TLC writes or SLC writes based on the host behavior model, such as by erasing or preparing a given memory block as a TLC block or SLC block.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, the first memory component 112A including (a word line (WL), a word line group (WLG), a block, portion, or page of the first memory component 112A), or group of memory components including the first memory component 112A can be associated with a first reliability (capability) grade, value, measure, or lifetime program-erase count (PEC). The terms "reliability grade," "value," and "measure" are used interchangeably throughout and can have the same meaning. The second memory component 112N (a WL, a WLG, a block, portion, or page of the second memory component 112N) or group of memory components including the second memory component 112N can be associated with a second reliability (capability) grade, value, measure, or lifetime PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different groups, bins, or sets of the memory components 112A to 112N to respective reliability grades, lifetime PEC values, read threshold voltages, program (write) temperatures, and/or current PEC values.

In some examples, a memory or register can be associated with all of the memory components 112A to 112N and can store a table that maps a first set of portions of the memory components 112A to 112N that have been programmed within a same first threshold time period (and/or at a same range of temperatures and/or are within a first threshold physical proximity to each other) with a first set of read threshold voltages, and a second set of portions of the memory components 112A to 112N that have been programmed within a same second threshold time period (and/or at a same range of temperatures and/or are within a second threshold physical proximity to each other) with a second set of read threshold voltages. These are referred to as different BFs. Namely, the first set of portions can be referred to as a first BF and the second set of portions can be referred to as a second BF. A media operations manager 122 can periodically scan for different sets of the portions. For example, the first BF can correspond to a first set of bins that are scanned every 20 minutes for the need to update the associated read threshold voltages. The second BF can correspond to a second set of bins that are scanned every 360 minutes for the need to update the associated read threshold voltages. The first set of bins can represent data that was programmed less recently than the second set of bins or vice versa. These intervals for when the BFs are scanned are usually fixed.

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, and a Universal Flash Storage (UFS) drive. Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a USB interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND-type flash memory and/or a (3D) NAND flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both a SLC portion and a MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe, and a single second row that spans a second set of the pages or blocks of the memory components 112A to 112N can correspond to or be grouped as a second block stripe.

A memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime PEC values and/or reliability grades associated with different groups of the memory components 112A to 112N and/or different WLs, WLGs, and/or blocks within each of the memory components 112A to 112N.

The memory sub-system controller 115 can be responsible for other memory management operations, such as wear leveling operations, garbage collection operations, error detection and ECC operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to perform different memory operations based on a host profile. The media operations manager 122 accesses a host behavior model comprising an amount of data and timing information. The amount of data representing how much data was written by a host system to a set of memory components in a past time period. The timing information indicating when program requests were received from the host system to program the data during the past time period. The media operations manager 122 searches the timing information of the host behavior model based on a current time to identify a time point in the host behavior model that corresponds to the current time. The media operations manager 122 retrieves, from the host behavior model, an amount of data parameter that corresponds to the identified time point and performs one or more memory operations based on the amount of data parameter retrieved from the host behavior model.

In some examples, the media operations manager 122 can comprise logic (e.g., a set of transitory or non-transitory machine instructions, such as firmware) or one or more components that cause the media operations manager 122 to perform operations described herein. The media operations manager 122 can comprise a tangible or non-tangible unit capable of performing operations described herein. Further details with regards to the operations of the media operations manager 122 are described below.

Figure 2:
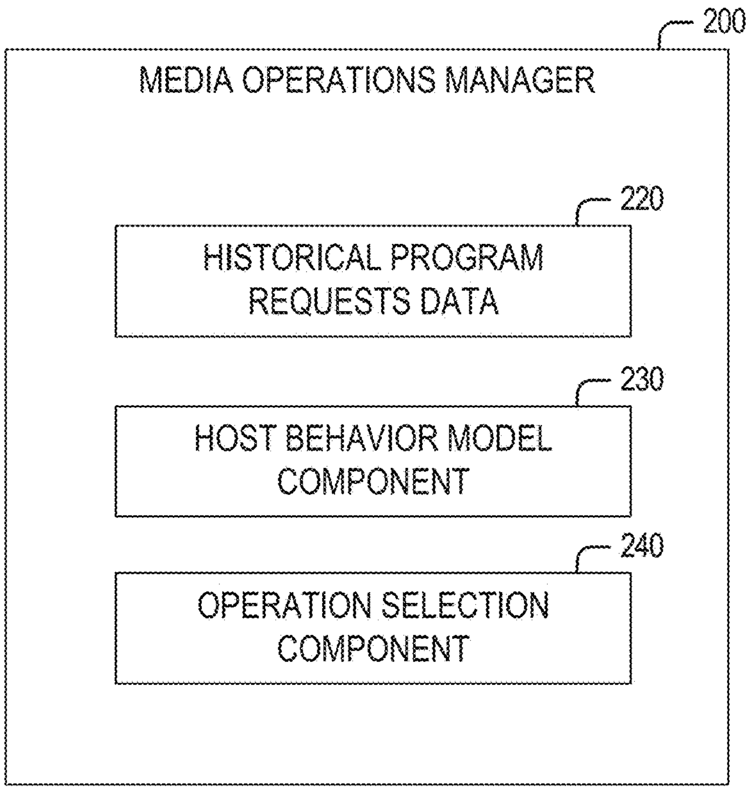
FIG. 2 is a block diagram of an example media operations manager, in accordance with some examples.

FIG. 2 is a block diagram of an example media operations manager 200 (corresponding to media operations manager 122), in accordance with some examples. As illustrated, the media operations manager 200 includes historical program requests data 220, a host behavior model component 230, and an operation selection component 240. In some cases, the media operations manager 200 can differ in components or arrangement (e.g., less or more components) from what is illustrated in FIG. 2.

The historical program requests data 220 can store information about program requests received from the host system 120 to program data. Specifically, the historical program requests data 220 can compute the amount of data requested by the host system 120 to be programmed. The historical program requests data 220 can be active during a training period and/or can be active continuously during the lifetime of the memory sub-system 110. The historical program requests data 220 can detect receipt of a request from the host system 120 to program data. The historical program requests data 220 can access or implement a local real time clock (RTC) representing the actually current time (e.g., 11:00 PM and/or day of the week). In some cases, the RTC can be synchronized initially with a clock or RTC of the host system 120 so both clocks represent the same current time.

The historical program requests data 220 can associate the RTC value with each program request received from the host system 120 and/or with each amount of data that is being programmed during a time period. The historical program requests data 220 can store a histogram that is divided by different time periods. Each time period can correspond to a minute in the day, an hour in the day, a day of the week, a season, and/or any other suitable time period. The historical program requests data 220 can identify a particular time period in the histogram that corresponds to the RTC value of a given program request. For example, the RTC value can be the time instance of 1:20 PM on Tuesday. In such cases, the historical program requests data 220 can identify a time period (e.g., the time between 1 PM and 2 PM on Tuesday) in the histogram. The historical program requests data 220 can then increment a counter by the amount of data specified to be programmed by the corresponding program request for that time period and can then remove the stored program request from the storage. The historical program requests data 220 can then process other program requests in a similar manner to update the histogram.

The historical program requests data 220 can continue monitoring program requests received from the host system 120 over a certain period of time (e.g., one day, one week, one month, one year) and/or continuously. The historical program requests data 220 can continue updating the histogram based on the received program requests. This way, the histogram can represent, for each time period, an amount or quantity of data requested to be programmed from the host system 120 for that time period. Once a threshold amount of information is processed by the historical program requests data 220 or when some other condition is met (e.g., the memory sub-system 110 has been operating for a threshold period of time of one week or one month or other suitable time period), the historical program requests data 220 can communicate the histogram to the host behavior model component 230. The host behavior model component 230 can generate a host behavior model based on the histogram. In some cases, the host behavior model is actually the histogram itself. In other cases, the host behavior model represents a summary of the histogram.

Figure 3:
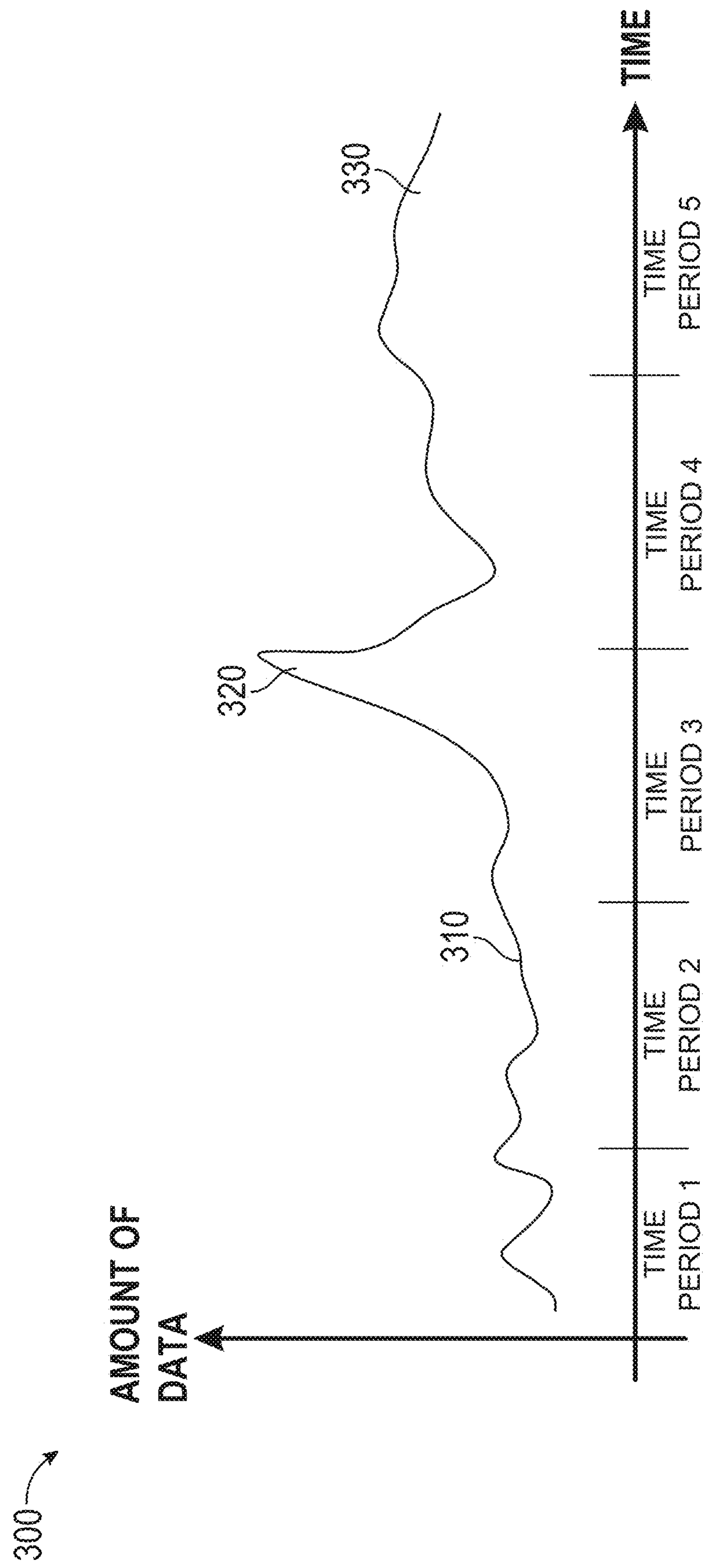
FIG. 3 is a chart of a host behavior model, in accordance with some examples.

For example, the host behavior model component 230 can generate the host behavior profile 300, shown in FIG. 3. The host behavior profile 300 can include multiple time periods (e.g., time period 1, time period 2, and so forth). For each time period, the host behavior profile 300 indicates the amount of data requested to be programmed by the host system 120. For example, the host behavior profile 300 can indicate a first amount of data 310 received during time period 2, a second amount of data 320 received during time period 3, and a third amount of data 330 received during time period 5. The time periods shown in the host behavior profile 300 can represent periods of time during different days of the week (e.g., time period 1 can be 8 AM-12 PM on day 1, time period 2 can be 12 PM-6 PM on day 1, time period 3 can be 6 PM-12 AM on day 1 and 12 AM-8 AM on day 2, time period 4 can be 8 AM-12 PM on day 2, time period 5 can be 12 PM-6 PM on day 2, time period 6 can be 6 PM-12 AM on day 2 and 12 AM-8 AM on day 3, and so forth).

The host behavior model component 230 can compare the amount of data for each time period to a specified idle amount threshold. For example, the host behavior model component 230 can compare the first amount of data 310 to an idle amount threshold. In response to determining that the first amount of data 310 is below the idle amount threshold (e.g., fails to transgress the threshold), the host behavior model component 230 can determine that the corresponding time period (e.g., time period 2) represents an idle time of the host system 120.

The host behavior model component 230 can compare the amount of data for each time period to a specified peak usage threshold. For example, the host behavior model component 230 can compare the second amount of data 320 to a peak usage threshold. In response to determining that the second amount of data 320 exceeds the peak usage threshold (e.g., transgresses the threshold), the host behavior model component 230 can determine that the corresponding time period (e.g., time period 3) represents a peak usage time of the host system 120.

The operation selection component 240 can receive a program request from the host system 120 indicating an amount of data to be programmed. The operation selection component 240 can access the current RTC value representing when the program request was received. The operation selection component 240 can communicate the current RTC value to the host behavior model component 230. The host behavior model component 230 can then provide to the operation selection component 240 a characteristic (e.g., idle time or peak usage time) in the host behavior profile 300 corresponding to the current RTC value. For example, if the RTC value is determined to correspond to the time period 2, the host behavior model component 230 can indicate that the current RTC value corresponds to idle time. For example, if the RTC value is determined to correspond to the time period 3, the host behavior model component 230 can indicate that the current RTC value corresponds to peak usage time.

In some examples, the operation selection component 240 can then trigger one or more memory operations based on the characteristic of usage indicated by the host behavior model component 230. For example, the operation selection component 240 can configure or set or change a size of a WB to be of a maximum size or a size larger than a default size in response to determining that the current RTC value corresponds to an amount of data that transgresses the specified peak usage threshold in the host behavior profile 300 (e.g., the current RTC value corresponds to time period 3). Similarly, the operation selection component 240 can trigger performing one or more background maintenance operations (e.g., media scan and/or garbage collection operations) in response to determining that the current RTC value corresponds to an amount of data that fails to transgress the specified idle amount threshold in the host behavior profile 300 (e.g., the current RTC value corresponds to time period 2).

In some examples, the host behavior model component 230 provides to the operation selection component 240 a value that includes an average or maximum amount of data received during an individual time period in the 300 that corresponds to the current RTC value. The operation selection component 240 can then set the WB to be of a size that matches the average or maximum amount of data received from the host behavior model component 230 based on the host behavior profile 300. This way, the operation selection component 240 can predictively or dynamically adjust the size of the WB used for a current set of program requests based on past behavior of the host system 120 (e.g., the amount of program request received in a similar or same time period in the past). For example, if the current time is 3:24 PM on Tuesday, the host behavior model component 230 can identify a time period (e.g., 12 PM-6 PM) that includes a range of times on a Tuesday that overlaps the current time. The host behavior model component 230 can then compute or retrieve the amount of data previously programmed on that time period. The operation selection component 240 uses the previous amount of data to configure the size of the WB used for a current set of program requests received from the host system 120.

In some cases, the operation selection component 240 can search the host behavior profile 300 for an idle period. The operation selection component 240 can then wait for the RTC value to correspond to the idle period. In response to determining that the current RTC value corresponds to the idle period, the operation selection component 240 can start performing one or more background maintenance operations. This allows the operation selection component 240 to schedule when background maintenance operations are performed and can modify when certain memory blocks are moved from SLC to TLC and/or are rewritten to other blocks. In some cases, the operation selection component 240 can select whether to perform direct TLC writes or to program data to an SLC first before transferring the data to the TLC storage based on the host behavior profile 300. For example, if the current RTC value corresponds to a time period associated with a medium or low amount of data 330, the operation selection component 240 can determine that the received requests to program data can be written to TLC storage directly. Similarly, if the current RTC value corresponds to a time period associated with the second amount of data 320 (e.g., peak usage), the operation selection component 240 can determine that the received requests to program data can be written to SLC storage first before being later migrated to TLC storage. This enables the operation selection component 240 to predictively prepare or erase memory blocks as TLC blocks or SLC blocks based on the host behavior profile 300.

Figure 4:
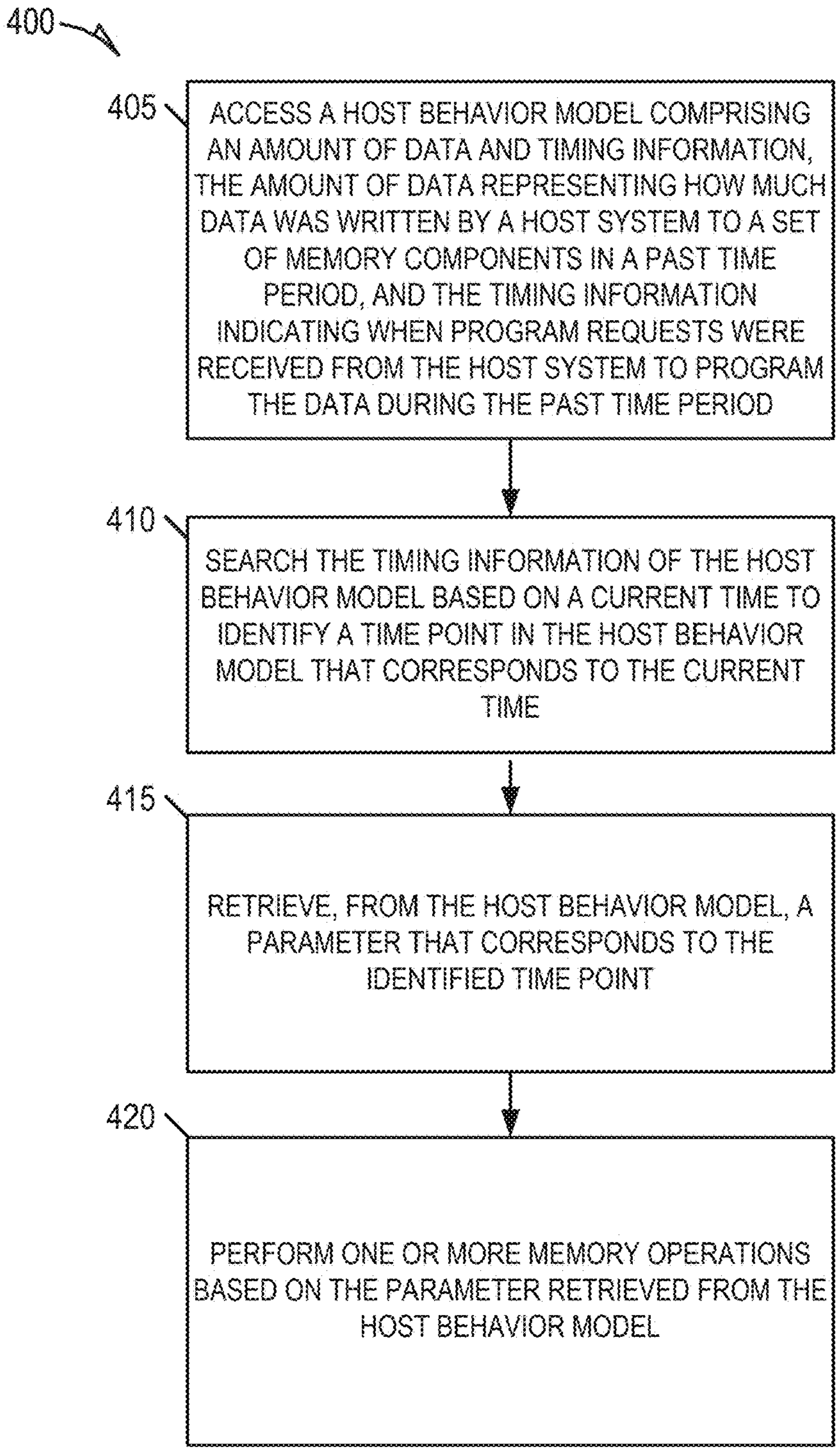
FIG. 4 is a flow diagram of an example method to selectively perform memory operations based on a host behavior model, in accordance with some examples.

FIG. 4 is a flow diagram of an example method to selectively perform memory operations based on a host behavior model, in accordance with some examples. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated techniques should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405, with a media operations manager 122 of a memory sub-system (e.g., memory sub-system 110) accessing a host behavior model (e.g., host behavior profile 300) including an amount of data and timing information, the amount of data representing how much data was written by a host system 120 to a set of memory components 112A to 112N in a past time period, and the timing information indicating when program requests were received from the host system 120 to program the data during the past time period. Then, at operation 410, the media operations manager 122 of the memory sub-system 110 searches the timing information of the host behavior model based on a current time to identify a time point in the host behavior model that corresponds to the current time. Thereafter, at operation 415, the media operations manager 122 retrieves, from the host behavior model, a parameter that corresponds to the identified time point. Then, at operation 420, the media operations manager 122 performs one or more memory operations based on the parameter retrieved from the host behavior model.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: accessing a host behavior model comprising an amount of data and timing information, the amount of data representing how much data was written by a host system to the set of memory components in a past time period, and the timing information indicating when program requests were received from the host system to program the data during the past time period; searching the timing information of the host behavior model based on a current time to identify a time point in the host behavior model that corresponds to the current time; retrieving, from the host behavior model, a parameter that corresponds to the identified time point, the parameter representing a specified amount of data previously programmed to the set of memory components; and performing one or more memory operations based on the parameter retrieved from the host behavior model.

Example 2. The system of Example 1, the operations comprising: receiving a plurality of program requests from the host system; and accessing a real time clock to associate a time with each of the plurality of program requests.

Example 3. The system of Example 2, the operations comprising: storing a histogram comprising a quantity of program requests field and a time field.

Example 4. The system of Example 3, the operations comprising: updating the histogram in response to receiving the plurality of program requests.

Example 5. The system of Example 4, the operations comprising: identifying a time field in the histogram corresponding to the time of a first program request of the plurality of program requests; and incrementing the quantity of program requests field associated with the identified time field.

Example 6. The system of Example 5, the operations comprising: determining whether a second program request of the plurality of program requests corresponds to the identified time field or a different time field in the histogram; and incrementing the quantity of program requests field associated with the identified time field or the different time field in response to determining whether the second program request of the plurality of program requests corresponds to the identified time field or the different time field in the histogram.

Example 7. The system of any one of Examples 5-6, the operations comprising: generating the host behavior model based on the histogram, the host behavior model comprising multiple time periods each associated with a different amount of program requests.

Example 8. The system of Example 7, wherein each time period represents a threshold number of seconds, a threshold number of hours, a different time of day, a different day of a week, a different day of a month, or a different season.

Example 9. The system of any one of Examples 2-8, the operations comprising: synchronizing the real time clock with a host clock of the host system.

Example 10. The system of any one of Examples 1-9, the operations comprising: configuring, in response to performing the one or more memory operations, a size of a write booster that is used to intermediately store data.

Example 11. The system of Example 10, the operations comprising: determining that the parameter transgresses a threshold value; and in response to determining that the parameter transgresses the threshold value, increasing the size of the write booster.

Example 12. The system of any one of Examples 10-11, the operations comprising: determining that the parameter fails to transgress a threshold value; and in response to determining that the parameter fails to transgress the threshold value, maintaining the size of the write booster as a default size.

Example 13. The system of any one of Examples 10-12, the operations comprising: setting the write booster size to a size represented by the parameter.

Example 14. The system of any one of Examples 10-13, wherein the write booster comprises a single-level cell (SLC) storage buffer, and wherein data is transferred to the set of memory components from the SLC storage buffer.

Example 15. The system of Example 14, wherein data stored in the SLC storage buffer is transferred to tri-level cell (TLC) storage.

Example 16. The system of any one of Examples 1-15, the operations comprising: identifying, based on the host behavior model, an idle time period within the past time period, the amount of data during the idle time period being below a threshold amount; determining that a current time corresponds to the idle time period; and in response to determining that the current time corresponds to the idle time period, performing one or more background operations as the one or more memory operations.

Example 17. The system of Example 16, wherein the one or more background operations comprise a media scan operation or garbage collection operation.

Example 18. The system of any one of Examples 1-16, the operations comprising: selecting between performing direct tri-level cell (TLC) writes or SLC writes based on the host behavior model.

Methods and computer-readable storage medium with instructions for performing any one of the above Examples.

Figure 5:
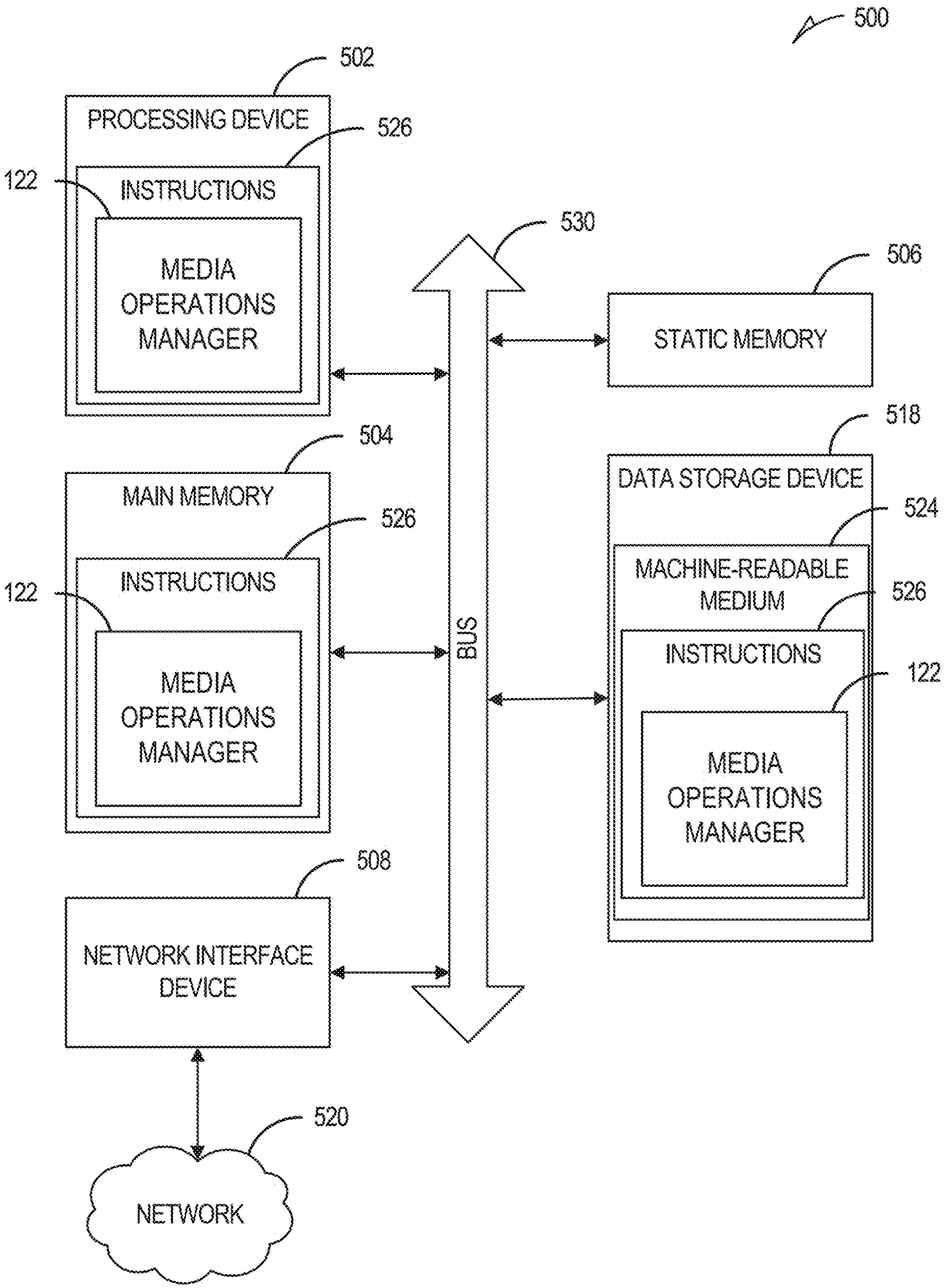
FIG. 5 is a block diagram illustrating a diagrammatic representation of a machine in the form of a computer system within which a set of instructions can be executed for causing the machine to perform any one or more of the methodologies discussed herein, in accordance with some examples.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage device 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an ASIC, a FPGA, a digital signal processor (DSP), a network processor, or the like. The processing device 502 is configured to execute instructions 526 for performing the operations and steps discussed herein. The computer system 500 can further include a network interface device 508 to communicate over a network 520.

The data storage device 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 can correspond to the memory sub-system 110 of FIG. 1.

In one example, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; EPROMs; EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, examples of the disclosure have been described. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device to perform operations comprising:

monitoring program requests received from a host system over a collection period to generate a histogram representing, for each of a plurality of time ranges, an amount of data requested to be programmed by the host system to the set of memory components during that time range;

determining that the memory sub-system has been operating for at least a threshold period of time;

based on determining that the memory sub-system has been operating for at least the threshold period of time, generating a host behavior model from the histogram, the host behavior model comprising a summary of the histogram that is different from the histogram, the host behavior model comprising an amount of data and timing information, the amount of data representing how much data was written by the host system to the set of memory components in a past time period, and the timing information indicating when program requests were received from the host system to program the data during the past time period;

searching the timing information of the host behavior model based on a current time to identify a past time point in the host behavior model that corresponds to the current time;

retrieving, from the host behavior model, a parameter that corresponds to the identified past time point, the parameter representing a specified amount of data previously programmed to the set of memory components; and performing one or more memory operations based on the parameter retrieved from the host behavior model, the one or more memory operations comprising adjusting a size of a write booster used for a current set of program requests based on past behavior information retrieved from the host behavior model of the parameter that corresponds to the identified past time point that corresponds to the current time.

2. The system of claim 1, the operations comprising:

receiving a plurality of program requests from the host system; and accessing a real time clock to associate a time with each of the plurality of program requests.

3. The system of claim 2, the operations comprising:

storing the histogram comprising a quantity of program requests field and a time field.

4. The system of claim 3, the operations comprising:

updating the histogram in response to receiving the plurality of program requests.

5. The system of claim 4, the operations comprising:

identifying the time field in the histogram corresponding to the time of a first program request of the plurality of program requests; and incrementing the quantity of program requests field associated with the identified time field.

6. The system of claim 5, the operations comprising:

determining whether a second program request of the plurality of program requests corresponds to the identified time field or a different time field in the histogram; and incrementing the quantity of program requests field associated with the identified time field or the different time field in response to determining whether the second program request of the plurality of program requests corresponds to the identified time field or the different time field in the histogram.

7. The system of claim 5, the operations comprising:

generating the host behavior model based on the histogram, the host behavior model comprising multiple time periods each associated with a different amount of program requests.

8. The system of claim 7, wherein each time period represents a different season.

9. The system of claim 2, the operations comprising:

synchronizing the real time clock with a host clock of the host system.

10. The system of claim 1, the operations comprising:

configuring, in response to performing the one or more memory operations, a size of a write booster that is used to intermediately store data.

11. The system of claim 10, the operations comprising:

determining that the parameter transgresses a threshold value; and in response to determining that the parameter transgresses the threshold value, increasing the size of the write booster.

12. The system of claim 10, the operations comprising:

determining that the parameter fails to transgress a threshold value; and in response to determining that the parameter fails to transgress the threshold value, maintaining the size of the write booster as a default size.

13. The system of claim 10, the operations comprising:

setting the size of the write booster size to a size represented by the parameter.

14. The system of claim 10, wherein the write booster comprises a single-level cell (SLC) storage buffer, and wherein data is transferred to the set of memory components from the SLC storage buffer.

15. The system of claim 14, wherein data stored in the SLC storage buffer is transferred to tri-level cell (TLC) storage.

16. The system of claim 1, the operations comprising:

identifying, based on the host behavior model, an idle time period within the past time period, the amount of data during the idle time period being below a threshold amount;

determining that a current time corresponds to the idle time period; and in response to determining that the current time corresponds to the idle time period, performing one or more background operations as the one or more memory operations.

17. The system of claim 1, wherein:

the parameter retrieved from the host behavior model comprises an average amount of data received from the host system during an individual time period that corresponds to the current time; and adjusting the size of the write booster comprises setting the size of the write booster to match the average amount of data retrieved from the host behavior model.

18. The system of claim 1, the operations comprising:

selecting between performing direct tri-level cell (TLC) writes or SLC writes based on the host behavior model.

19. A method comprising:

monitoring program requests received from a host system over a collection period to generate a histogram representing, for each of a plurality of time ranges, an amount of data requested to be programmed by the host system to a set of memory components of a memory sub-system during that time range;

determining that the memory sub-system has been operating for at least a threshold period of time;

based on determining that the memory sub-system has been operating for at least the threshold period of time, generating a host behavior model from the histogram, the host behavior model comprising a summary of the histogram that is different from the histogram, the host behavior model comprising an amount of data and timing information, the amount of data representing how much data was written by the host system to the set of memory components in a past time period, and the timing information indicating when program requests were received from the host system to program the data during the past time period;

searching the timing information of the host behavior model based on a current time to identify a past time point in the host behavior model that corresponds to the current time;

retrieving, from the host behavior model, a parameter that corresponds to the identified past time point, the parameter representing a specified amount of data previously programmed to the set of memory components; and performing one or more memory operations based on the parameter retrieved from the host behavior model, the one or more memory operations comprising adjusting a size of a write booster used for a current set of program requests based on past behavior information retrieved from the host behavior model of the parameter that corresponds to the identified past time point that corresponds to the current time.

20. A non-transitory computer-readable storage medium comprising instructions that, when executed by at least one processing device, cause the at least one processing device to perform operations comprising:

monitoring program requests received from a host system over a collection period to generate a histogram representing, for each of a plurality of time ranges, an amount of data requested to be programmed by the host system to a set of memory components of a memory sub-system during that time range;

determining that the memory sub-system has been operating for at least a threshold period of time;

based on determining that the memory sub-system has been operating for at least the threshold period of time, generating a host behavior model from the histogram, the host behavior model comprising a summary of the histogram that is different from the histogram, the host behavior model comprising an amount of data and timing information, the amount of data representing how much data was written by the host system to the set of memory components in a past time period, and the timing information indicating when program requests were received from the host system to program the data during the past time period;

searching the timing information of the host behavior model based on a current time to identify a past time point in the host behavior model that corresponds to the current time;

retrieving, from the host behavior model, a parameter that corresponds to the identified past time point, the parameter representing a specified amount of data previously programmed to the set of memory components; and performing one or more memory operations based on the parameter retrieved from the host behavior model, the one or more memory operations comprising adjusting a size of a write booster used for a current set of program requests based on past behavior information retrieved from the host behavior model of the parameter that corresponds to the identified past time point that corresponds to the current time.

* * * * *